United States Patent [19]

Laing et al.

[11] 4,172,766
[45] Oct. 30, 1979

[54] SOLAR ENERGY COLLECTORS AND PLANTS OPERATED BY THEM

[76] Inventors: Nikolaus Laing; Ingeborg Laing; Oliver Laing, all of Hofener Weg 35-37, 7141 Aldingen, Fed. Rep. of Germany

[21] Appl. No.: 620,250

[22] Filed: Oct. 6, 1975

[30] Foreign Application Priority Data

Oct. 9, 1974 [AT] Austria .............................. 8105/74
Mar. 4, 1975 [AT] Austria .......................... 141641/75

[51] Int. Cl.$^2$ .......................... C02B 1/04; F24J 3/02
[52] U.S. Cl. .............................. 202/173; 202/185 A; 202/234; 202/197; 203/11; 203/22; 203/DIG. 1; 203/90
[58] Field of Search .................... 60/641, 271, 659; 126/271; 203/100, DIG. 1, 11, 10, 90, 22; 202/185 A, 234, 173, 197; 159/1 S, 1 SF

[56] References Cited

U.S. PATENT DOCUMENTS

| | | | |
|---|---|---|---|
| 2,803,591 | 8/1905 | Coanda et al. | 203/DIG. 1 |
| 3,076,096 | 1/1963 | Bachmann | 203/DIG. 1 |
| 3,168,450 | 2/1965 | Black | 203/DIG. 1 |
| 3,206,379 | 9/1965 | Hill | 203/100 |
| 3,219,554 | 11/1965 | Woodward | 203/100 |
| 3,232,846 | 2/1966 | Kimmerle | 203/DIG. 1 |
| 3,232,847 | 2/1966 | Hoff | 203/DIG. 1 |
| 3,242,975 | 3/1966 | Kogan | 203/100 |
| 3,298,932 | 1/1967 | Bauer | 203/100 |
| 3,446,711 | 5/1969 | Rosenstein et al. | 203/100 |
| 3,692,634 | 9/1972 | Othmer | 203/11 |
| 3,775,257 | 11/1973 | Lovrich | 203/DIG. 1 |
| 3,928,145 | 12/1975 | Othmer | 203/11 |

FOREIGN PATENT DOCUMENTS

448833 9/1949 Italy .................................. 203/DIG. 1
28130 of 1907 United Kingdom ............. 203/DIG. 1

Primary Examiner—Wilbur L. Bascomb, Jr.
Attorney, Agent, or Firm—Pennie & Edmonds

[57] ABSTRACT

A solar energy collector floating on water is supported by fluid cushion and comprises elements each of them consist of a solar energy absorbing layer arranged between two heat insulating layers.

6 Claims, 14 Drawing Figures

SOLAR ENERGY COLLECTORS AND PLANTS OPERATED BY THEM

THE PRIOR ART

Equipment is known in which the solar radiation is focussed by reflectors which are tracked in the direction of the sun. It is also known to design reflectors in the form of blackened foil cushions which are stretched over hot water storage accumulators and float on a water surface. Finally, it is known to absorb solar energy by parabolic mirrors with tubes situated at their focal axes, which convey a fluid heat carrier. Insofar as they heat a heat carrier flowing through them, the known devices are built as rigid mechanical structures. For reasons of strength, these structures can only have limited dimensions.

Owing to the low energy flux density of solar radiation, only relatively small power flows can be economically converted by apparatus which is limited in size.

The conversion of the thermal energy so extracted as well as its utilisation for sea water desalination can only be accomplished economically if power flows are made available of a magnitude similar to those from normal power stations. This need defines solar collector dimensions measured in square kilometers.

THE OBJECT OF THE INVENTION

The object of the invention is to provide a solar collector which is designed to float on water or air and which comprises elastic elements not subject to bending stresses within the range of their application.

DESCRIPTION OF THE INVENTION

Water surfaces offer favourable conditions for collectors intended to be spread over a flat surface. Collectors according to the invention comprise several flexible layers of which the lowest is an insulating layer, the layer above it conducts a heat carrier and the top layer serves to prevent convection losses. These layers can be prefabricated in the form of elements of large surface area. They are assembled by joining a large number of identical elements into a complete floating platform which, in turn, is surrounded by peripheral elements, to be described below, so designed as to make a radial prestretching of the solar collector elements possible. A favourable form of embodiment of the convection-preventing layer has vertical walls arranged at spacings such that thermal convection is prevented within this layer. It is a further distinguishing feature of the invention that the solar collector platform floating on water is provided with equipment which can rotate and translate the platform on the water so as to make the vertical walls of the convection-preventing layer, which run parallel to each other, track the direction of the sun.

The layer serving as the thermal insulation in the downward direction may consist, for example, of air chambers which are formed by a grating of parallel foil hoses. In another form of embodiment, this insulating layer consists of an air cushion, wherein provisions must be made for one of the layers lying above it to be airtight. In the latter embodiment, a skirt surrounding the entire platform must be so designed as to seal the air cushion against the outside. This form of embodiment is then usable on dry land if a ditch is provided into which this skirt is immersed.

A preferred field of application is electricity generation. In this application, a fluid heat carrier is pumped through ducts in the heat carrier conducting layer. The heat so extracted heats up a quantity of stored water, for example, in a foil container immersed in the water. The heat may serve for feeding a turbine. In order to reject the energy of condensation, cold depth water is pumped into a condenser and is heated there by absorbing the heat of condensation. If sea water is evaporated, then, according to the invention, the condensate can be extracted as fresh water. However, the plant, according to the invention, may also be so designed that it is entirely deployed for sea water distillation. In this case, the heat of condensation is drawn on for repeated distillation in further stages. The heated depth water used for condensation may, according to the invention, be utilised for a biological process for protein production. To this end, the depth water, which contains products of biological disintegration in a relatively high condensation, is fed, after being heated by the condensation energy, into breeding basins which are exposed to solar radiation. The mineral content is converted into algae. In turn, the algae can be used to feed mussels and other animals for producing animal protein.

It is an essential distinguishing feature of the invention that the elements used in a platform, which can be designed as a floating island, are not only capable of performing all the functions necessary to convert solar energy but can also be joined together to build up an entirely freely floating installation, which can take part in any desired translational and rotational motion over the surface on which it floats. This facility has not been achieved by any of the solar collector systems known hitherto.

The invention will be explained with the help of figures.

Figure 1:
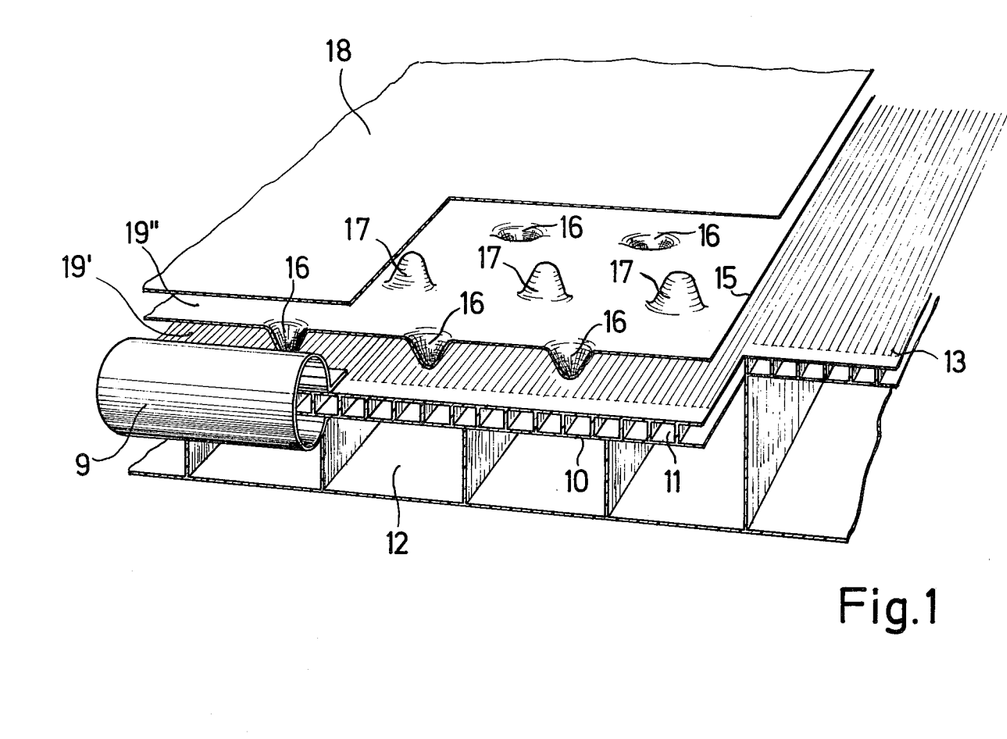
FIG. 1 shows a perspective cross-sectional view of a cut-out from a solar collector according to the invention.

FIG. 1 shows a cross-section through a cut-out of a solar collector 1 according to the invention. An extruded profile 10 of synthetic material with a large number of, for example, rectangular ducts 11 serves as the collector layer which conducts the fluid heat carrier. The lower insulating layer consists of larger air-filled ducts 12 which serve simultaneously as floats. A layer 13 is deposited over the surface facing the sun. This layer possesses selective radiation properties and behaves as a black body in relation to the absorption of solar radiation, whilst it does not emit radiation in the infrared range. A transparent layer 15 is situated above the layer 13. The transparent layer has projections 16 facing downwards at regular distances and also the same number of projections 17 facing upwards as well as a transparent flat covering 18. A sub-division of the thermally insulating air space transparent to radiation into two spaces 19' and 19" is achieved by the projections 16 and 17, whereby the horizontal extension of these chambers can be kept so small that convection cannot take place. The channels 11 open out, as explained in greater detail with the help of FIG. 6, into a system of conduits, the smallest manifold ducts 9 of which form the inlet and outlet conduits at the two ends of the layer 10.

Figure 2A:
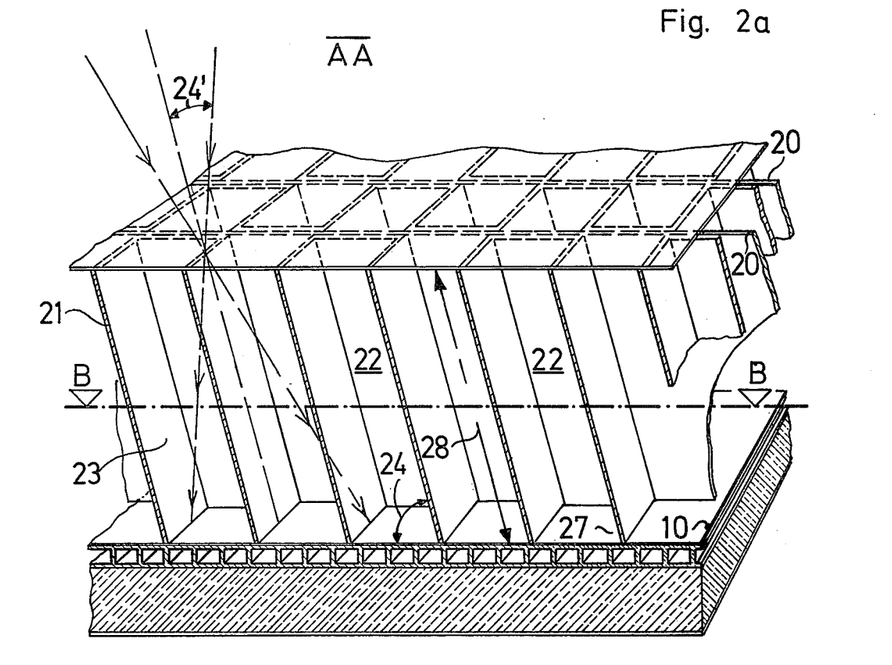
FIG. 2a and FIG. 2b show, in a vertical longitudinal cross-section and in a horizontal cross-section, a cut-out from a convection-inhibiting upper insulating layer of a solar collector according to the invention.
Figure 2B:
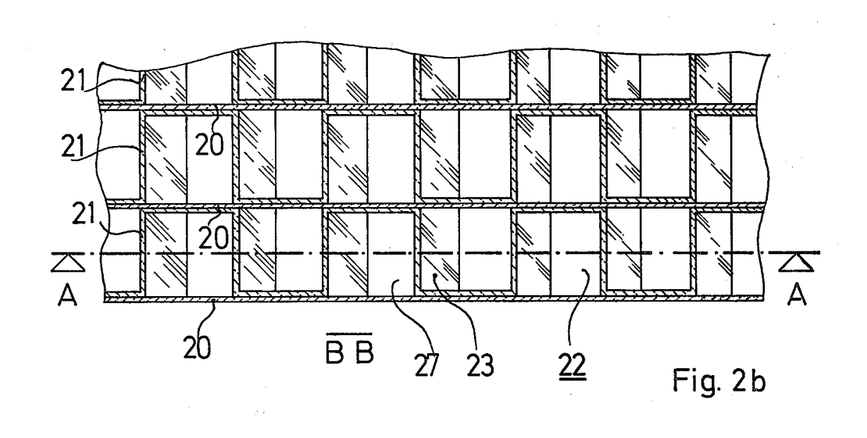

The FIGS. 2a and 2b show a design of the upper layer on the top of the solar collector layer 10, which reduces the convection losses in the upward direction and which consists of wall strips 20 positioned vertically and in parallel to the solar radiation and of spacer elements 21 folded in a meandering fashion between the wall strips to form spacer element cells 22. The cross-section of the spacer element cells 22 is rectangular, and have walls 23 which are positioned at an angle 24 which is derived from the highest position of the sun as determined by the geographic latitude. According to the power demand during the seasons, this angle 24 is so chosen that the reflection losses caused by the reflection of the solar radiation from the walls 23 as a consequence of the varying altitude of the sun are kept as small as possible, i.e., so that, within the range of effective solar radiation, single reflection only takes place from these walls 23 rather than multiple reflection. According to the invention, the angle 24 is at an optimum if, during the season in which a maximum energy generation is desired, this angle is smaller than the highest position of the sun by the angle 24' at which a double reflection before reaching the collector surface 27 is just avoided. The cross-section of the cells 22 is guided by the temperature difference between the collector surface 27 and the ambient air as well as by the total height of the convection-inhibiting layer 28. The larger the height of this layer 28, the better is the insulation, though only if the cross-section of the cells 22 is made small enough so that no thermal convection takes place in the obliquely positioned cells, whilst the extension parallel to the walls 20 should be larger than the distance between the walls 20. However, the solar collector possesses its maximum transparency to radiation only when the ducts track the direction of the sun. This tracking is accomplished by rotating the floating or hovering solar collector system. A covering in the upward direction prevents contamination of the cells. A reflective coating can be applied to the separating walls 20, 23. The above design of a solar collector can be used for solar collectors of any type.

Figure 3:
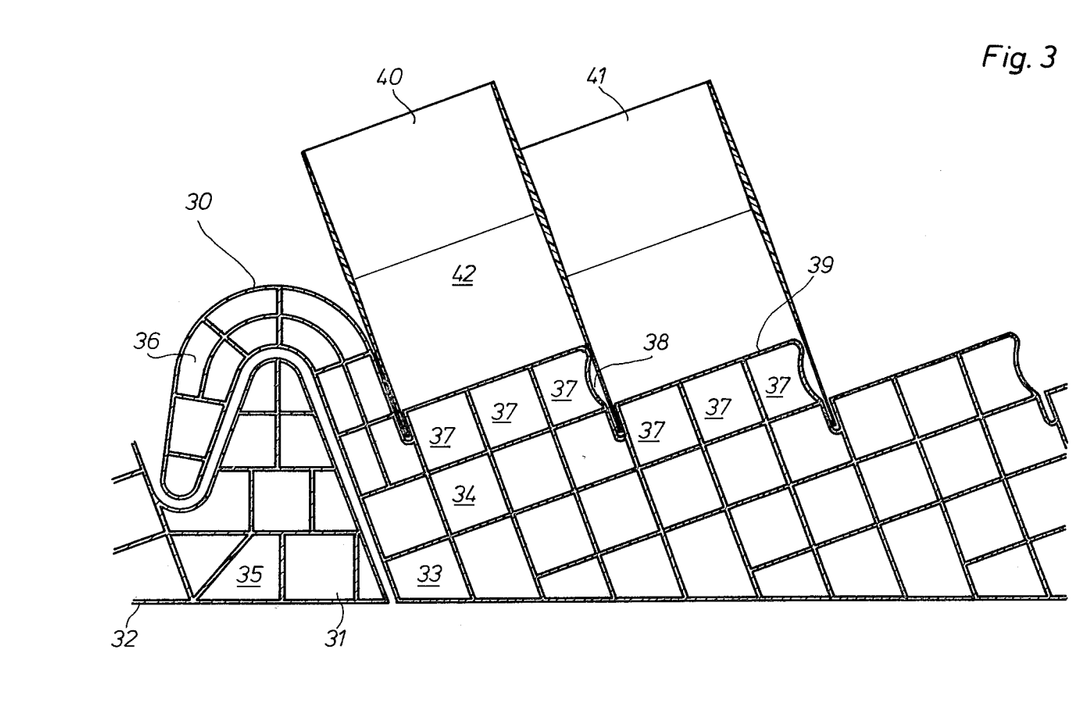
FIG. 3 shows, in a partial longitudinal cross-section, a further form of embodiment of a solar collector according to the invention.

FIG. 3 shows a further form of embodiment of the collectors illustrated in FIGS. 1 and 2. The collector system consists of a large number of wide parallel strips which are made by the extrusion of, preferably, polyolefines. The width of each strip amounts to between 1 and 4 mm. Hook-shaped portions 30 are formed along the edges which engage matching portions 31 of the adjacent strip. The ducts 33 and 34 serve as floats and as an insulation and also inhibit the downward infrared radiation flux. The ducts 33, 34, 35, 36 are closed at the two axial ends of a strip. The fluid heat carrier, normally fresh water or, at high temperatures, oil or glycol, is conducted through the ducts 37. As before, these ducts 37 communicate at their ends with the manifold ducts of the conduit system. The space 38 serves as an insulation. The layer 39 forms the absorbing layer of the solar collector. The obliquely positioned ducts 40 and 41, which have a rectangular cross-section 42, consist of synthetic material and may be open on top. They are preferably formed from a grating made by injection moulding and their walls are thicker in the middle region but taper off both upwards and downwards so that mould portions can be withdrawn from both sides. The cells remain open on top. By applying a reflective coating to their walls the corrosive effect of ultra-violet radiation is prevented.

Figure 4:
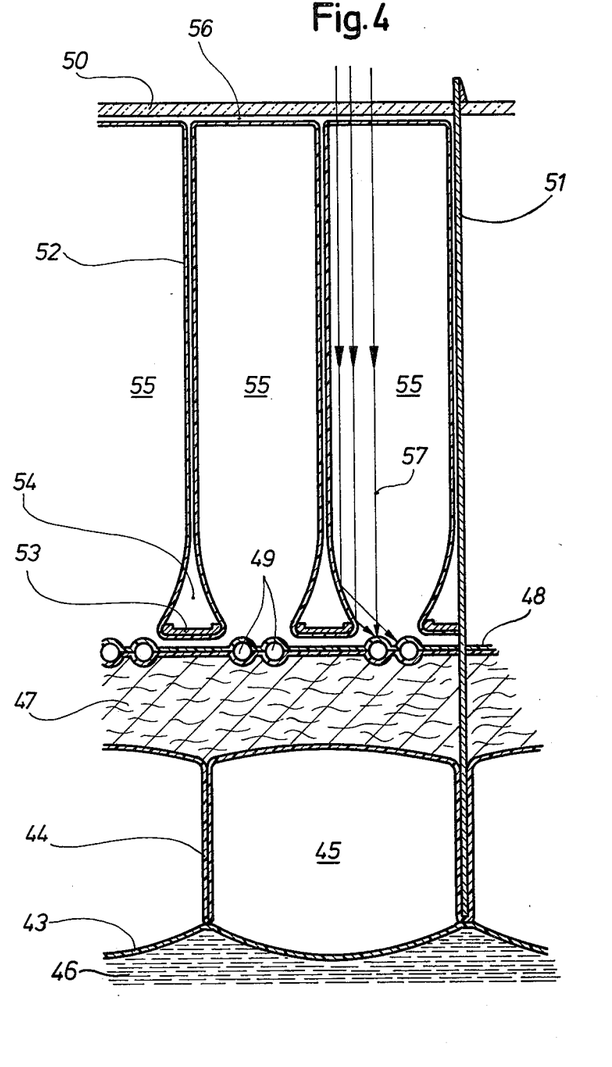
FIG. 4 shows, in a partial cross-section, yet another form of embodiment of a solar collector according to the invention.

FIG. 4 shows a solar collector with focussing ducts. The ducts 45 formed of two foils 43 and 44, float on the water 46 and carry the collector. The collector panel 48 is situated above a thermally insulating foam layer 47. The collector panel is formed by two welded foils. The foils enclose between them the heat carrier ducts 49, the surface of which facing the sun consists of the absorbing layer. Glass panes 50 are placed over the entire collector. The glass panes are carried by vertical wall elements 51. A foil 52 laid down in a meandering pattern is situated underneath the panes 50. A reflective coating is applied to the vertical webs of the foil. The lower portions of the foils are held by spacer profiles 53 which also act as weights. The triangular space 54 is connected e.g. with the ambient air whilst the cells 55 are filled with air at a slight excess pressure which, in the vertical region, presses the foils 52 against each other and, in the horizontal region 56, against the pane 50. The path of the sun rays 57 shows the focussing effect created by the fact that the interaction of the weight of the profiles 53 and the pressure difference between the spaces 54 and 55 produces a parabolic curvature of the wall. The axes of the focussing ducts, however, always point towards the compass bearing in which the sun is situated at the time.

Figure 5:
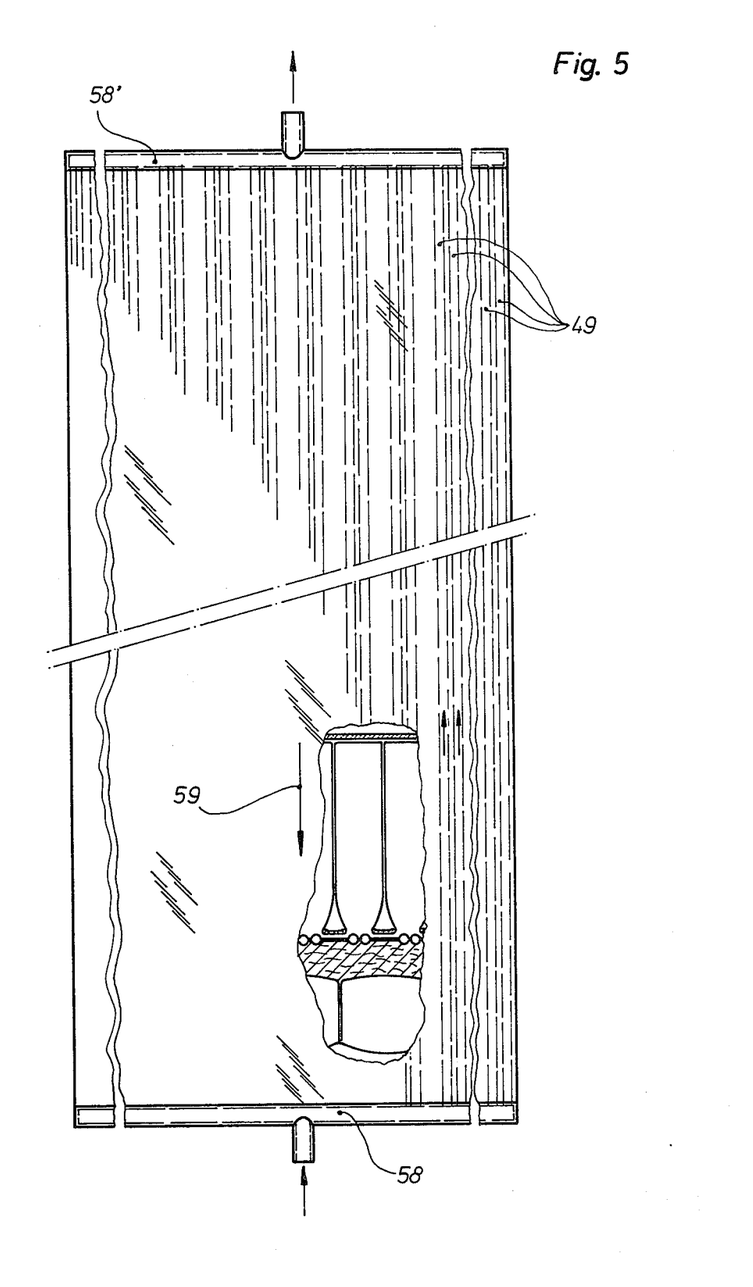
FIG. 5 shows a plan view of a solar collector element of the type shown in FIG. 4.

FIG. 5 shows a scaled-down plan view of a solar collector element. Each tube 49 communicates with the inlet manifold conduit 58 and the outlet manifold conduit 58' at the ends of the solar collector panel. The heat carrier flows from the manifold conduit 58 to the manifold conduit 58'. The arrow 59 shows the direction towards the sun.

Figure 6:
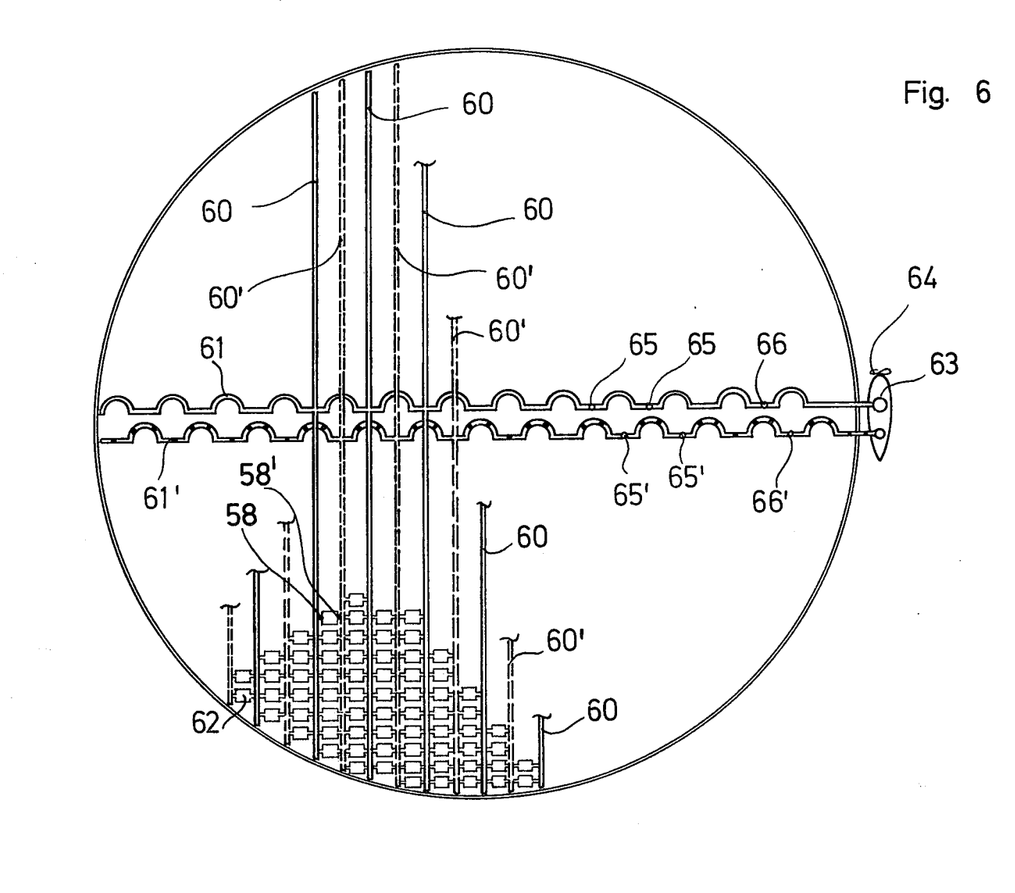
FIG. 6 shows, in a diagrammatic plan view, the power flow system of a solar collector according to the invention.

FIG. 6 shows diagrammatically the manifolding system. The inlet manifold conduits 58 communicate with the forward flow tubes 60 as shown in FIG. 5 and the outlet manifold conduits 58' of the solar collector units 62 communicate with the return flow tubes 60', shown in broken lines. All forward flow tubes 60 communicate with the main pipeline 61 and all return flow tubes 60' communicate with the main pipeline 61'. These main pipelines start and finish, respectively, on a ship 63, in which the power station or the distillation plant are situated. In addition, these pipelines communicate, via vertical pipelines 65 and 65', with thermal storage accumulators arranged underneath the solar collector system. The propeller 64 of the ship attached to the platform simultaneously drives the rotation of the platform. If storage accumulators with different temperatures are provided, additional communicating pipelines 66 and 66', etc. are provided accordingly. In each case, the particular storage accumulator is made to communicate with the return flow tubes 60', in which the temperature matches the temperature rise of the heat carrier caused by the solar collector. When the sun is high, the forward flow water is withdrawn from storage accumulators with a lower temperature and the return flow water is fed to storage accumulators with a higher temperature.

Figure 7:
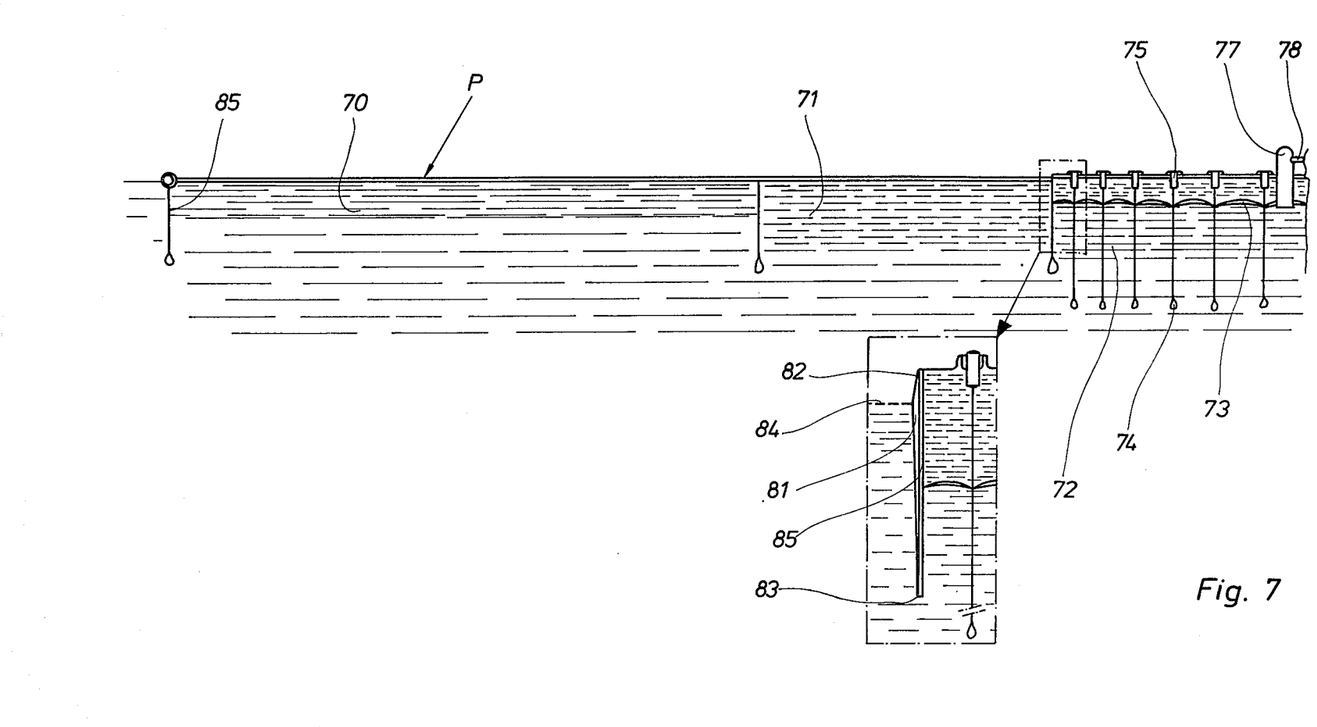
FIG. 7 shows, in a radial cross-section, a floating platform with a solar collector system according to the invention.

FIG. 7 shows a cross-section through a platform P with solar collector units according to the invention. Storage accumulators, namely, 70 for 50° C., 71 for 90° C. and 72 for 175° C., are arranged underneath the solar collector system. The storage accumulator for 175° C. is separated by a cover 73 from the cold water lying above it. This water creates a pressure which is higher than the boiling pressure. The weights 74 prevent a lifting of the cover 73. The floats 75 stabilise this in its unstable horizontal position. The evaporator 77 supplies a power plant with fresh steam via the pipeline 78.

The storage accumulator is surrounded by a cylindrical wall 81, which carries the hoop stresses and which consists of a coil of glass-reinforced synthetic material. The wall thickness of this cylindrical wall both at the upper edge 82 and at the lower edge 83 amounts to a few millimeters only but, at the level of the water line 84, the wall thickness is a maximum because the radial pressure reaches its maximum at this level. The accumulator spaces 70, 71, 72 are open underneath towards the sea. The water, thermally stratified in a stable manner, acts as the thermal insulation. Fresh water serves in the low-temperature solar collectors to feed the solar energy into the thermal storage accumulators. Heat carrier oil or glycol perform the same function in the high-temperature solar collectors. Just as the cylinder 81 is stretched by a radial load system when the water enclosed within is hotter than the water surrounding it, so the foil 85 is also subject to forces acting radially outward which cause a radial pre-stretching in the outboard directions of the flexible platform P, i.e., of the solar collector system so that folds do not form.

Figure 8:
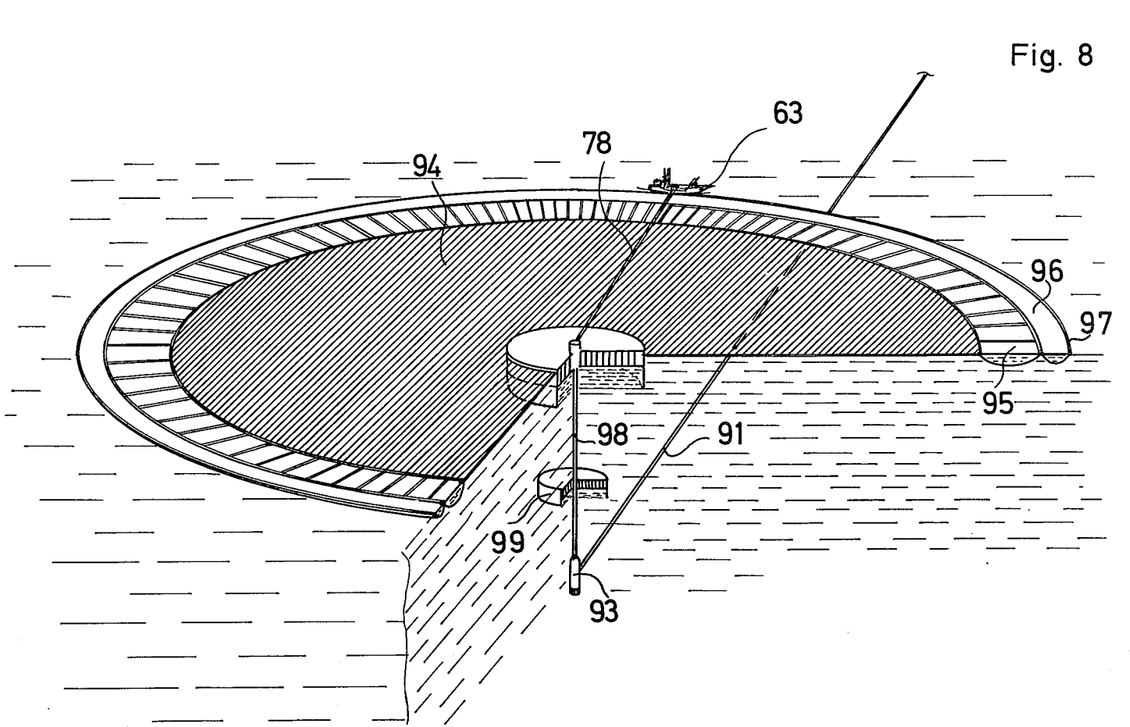
FIG. 8 shows the floating platform, illustrated in FIG. 7, in a perspective partial cross-sectional view.

A platform P according to the invention is shown in FIG. 8 in a perspective view. The power plant is situated in the power station ship 91 and is connected via a steel pipeline 78 to the evaporator 77. In addition, a cold water pipeline leads from a pump 93 suspended near the bottom of the sea, along the pipeline 78 to the ship 91. The evaporators and condensers as well as the operating rooms and living quarters are situated in the power station ship. The hatched area 94 of the solar collector disc carries collector elements for different temperatures. A circular trough 95 open at the top, surrounds the periphery of the collector disc and serves as a breeding basin. Further outboard, another circular channel 96 is situated which serves to heat up the depth water. The outermost channel is covered up with a foil to prevent infection of the sterile depth water by waves beating over the air hose torus. The platform P is connected to the consumer area for fresh water and electric power via the conduit 98, which is coupled to the station 93 at the bottom of the sea. A slowly rotating propeller of the power station ship, in cooperation with either a second ship or simply with an electrically driven propeller causes a continuous rotation of the entire island so that the solar collector ducts are always aligned exactly at right angles to the sun. In addition, in the presence of wind or sea currents, a thrust equal to the magnitude of the wind drag or sea current resistance is produced by the same propellers so that the plant does not require anchoring. The position fix is accomplished by two radio beacons installed on land. At a great depth, another storage accumulator bell 109 is situated above the pump 103. The bell acts as an accumulator at a temperature of which the corresponding boiling pressure is equal to the hydrostatic pressure at the depth of the accumulator.

A power plant according to the invention consists of an evaporator, heat exchangers for pre-heating the feed water, turbo-generators and condensers. All this equipment is housed in the power station ship. Water is used as the working fluid for the high-temperature turbine and a hydrocarbon, for the low pressure turbine. The plant is described below with the help of the circuit diagram in FIG. 9.

Figure 9:
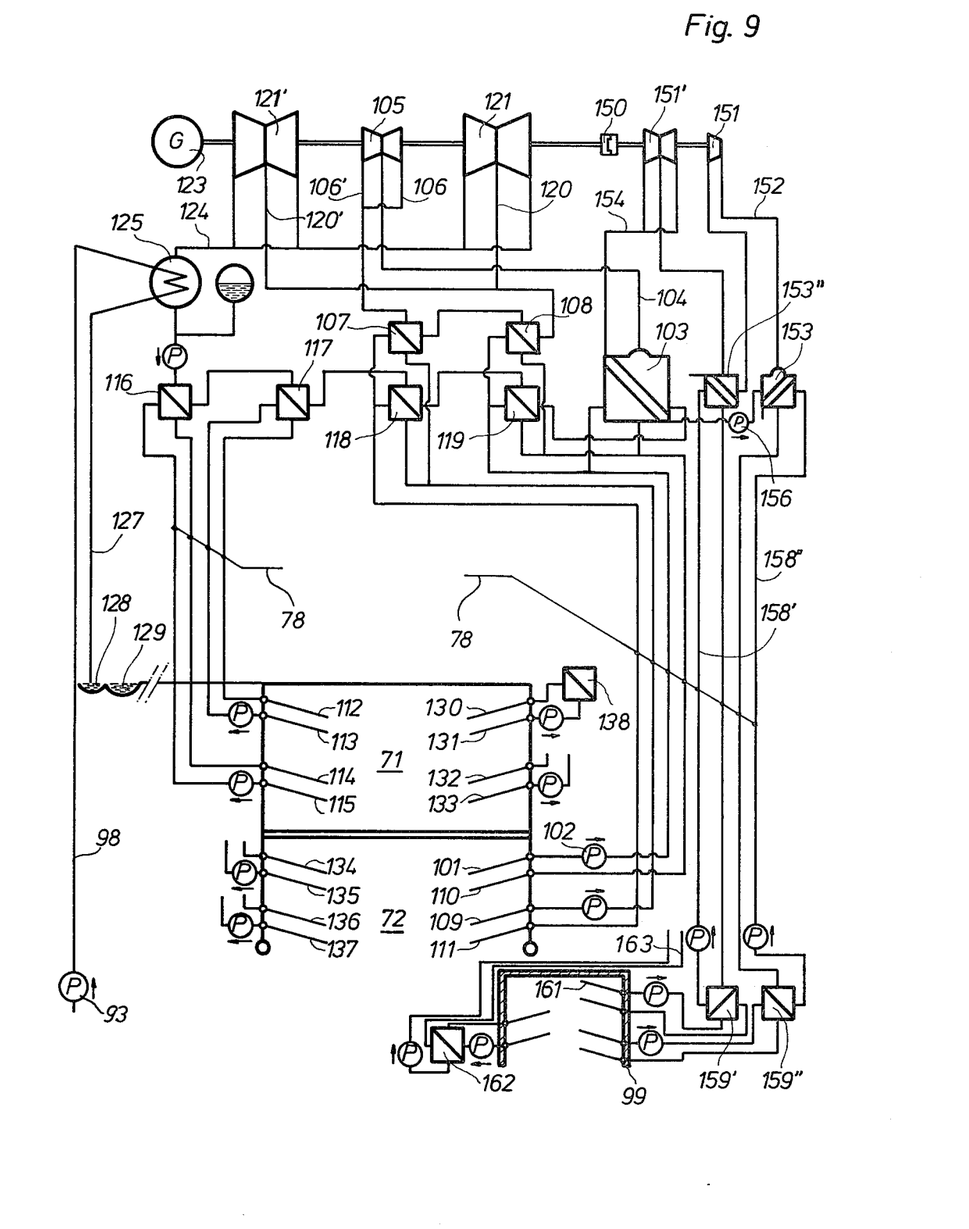
FIG. 9 shows a circuit diagram of a high-temperature plant according to the invention.

The tube 101, capable of being swivelled into the appropriate height level, extracts sea water at a temperature $T_s = 175°$ C. out of lower floating storage accumulator 72. The pump 102 performs the pumping. This hot water reaches the evaporator 103 and there transfers its heat to the condensate, pre-heated to boiling temperature. The steam so generated is fed via the pipeline 104 to the medium-pressure turbine 105, made of metal. The steam discharged from this turbine flows through the pipelines 106 and 106' to the superheaters 107 and 108 which also receive their heat flow from the lower accumulator 72. At the height level of the inlet of tube 109, adjustable in height, the storage water temperature should amount to about 115° C. and the additional superheating in the superheater 108 is performed by water with a temperature of 175° C. The return flow of the water proceeds through the tubes 110 and 111, both adjustable in height. Controlled by the return flow temperature, these tubes discharge the cooled water at a height level which corresponds to the return flow temperature. Similar inlet and discharge tubes 112, 113, 114 and 115, capable of being swivelled into the desired height level, supply the condensate pre-heaters 116 and 117 with water at temperatures of 50° and 90° C., respectively, whilst the condensate pre-heaters 118 and 119 draw their heat from the circulation in the tubes 101 and 110 or 109 and 111, respectively. The steam from the superheater 108, after intermediate superheating, reached the low-pressure turbines 121 and 121' via the pipelines 120 and 120'. The temperatures in these turbines are so low that they can be made of glass fibre reinforced synthetic materials and fibre-filled injection moulded synthetic materials. The turbines drive the generator 123, via the common shaft. The discharged vapour flows through the manifold pipe 124 to the condenser 125 which receives cooling water from the pump 126 in the sea floor station. The heated cooling water reaches the pre-heating basin 128 at the periphery of the solar collector island via the pipeline 127 and, after further heating, flows into the breeding basins 29.

Additional tubes 130, 131, 132, 133, in the low-temperature storage accumulator and 134, 135, 136, 137 in the high-temperature storage accumulator, capable of being swivelled into the desirable height level, are connected to the heat exchanger 138 and further heat exchangers (not shown), which are traversed by the heat carrier fresh water of the solar collector. In order to increase the efficiency of the power station, the maximum temperature in special region 162 of the solar collector is raised to 300° C. The steam turbines 151 and 151' are coupled up through the same shaft, by the interposition of an overrunning clutch, to the turbines 121 and 121'. The turbines 151 and 151' draw their steam at 300° C. from the evaporator 153 through the steam pipeline 152. The expanded steam of the turbine stage 151 reaches first the intermediate superheater 153", which injects new energy from the storage accumulator, and subsequently, the low-pressure part 151'. From there, the steam proceeds into the power manifold 154 and into the evaporator 103 for the hydrocarbon fluid. The heat of condensation is fed to the hydrocarbon secondary turbine 105/121. The condensed water from the hydrocarbon evaporator returns through the boiler feed pump 156 to the 300° C. evaporator 153. The feed water preheating by bled-off steam, in a manner familiar in nuclear reactor power stations, is eliminated because storage accumulator heat is available in all temperature ranges. The evaporators 153 draw their heat via hot oil pipelines 158' and 158", respectively, from the heat exchangers 159' and 159" which, in turn, draw their heat from the lower storage accumulator 99. The hot fresh water with a temperature of 300° C., which is extracted from the storage accumulator 99 at the bottom of the sea, by the tube 161, capable of being swivelled into the desired height level, flows through these heat exchangers 159' and 159". The feeding in of energy of the thermal charging of the storage accumulator 99 also proceeds, with the interposition of a heat exchanger 162, via the hot oil in the pipeline 163, which flows, without pressure, through the solar collector ducts (not shown) of the high temperature region and, after cooling down, is returned, via the tube situated underneath, to the storage accumulator.

The hydrocarbon turbine is subdivided into two stages 105 and 121. If the low-load power output of the power station is less than 60% of the peak-load power output, a further evaporator for the 115° C. temperature range is required. By disengaging the intermediate pressure turbine 105, the generator power output can be reduced down to 30% of the maximum power. By this means, in contrast to all other power stations, energy is fed to the respective turbines at the appropriate generation quality, i.e., on disengaging the steam turbine, the flow of high-grade energy from the 300° C. storage accumulator is discontinued. On additionally disengaging the intermediate pressure turbine 105, the storage accumulator range 72 is shut off in addition so that only the low-temperature energy, which can be extracted at the maximum utilisation of the solar collector, is utilised.

Figure 10:
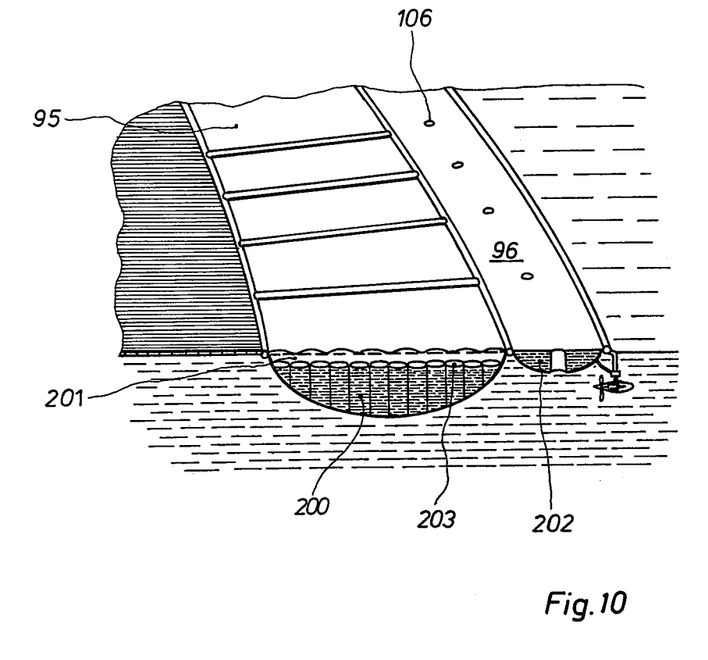
FIG. 10 shows, in a perspective partial cross-sectional view, the peripheral zone of a floating platform according to the invention designed as a breeding basin for sea plants.

The utilisation of the non-convertible energy content, accruing in electric power generation, which amounts to 66% of the total absorbed solar energy, may, according to the invention, take place in a biological process station where phyto-plankton and marine animals are grown. As is well known, the concentration of nutrient salts in the sea increases with increasing depth because all the debris of the world oceans are slowly sinking towards the bottom. These nutrient salts transported upwards with the condenser cooling water are then further heated in a blackened solar collector trough 202 which is covered with a plastic foil to prevent infection. Biological growth takes place in the upper layer 201 of the trough 105 according to FIG. 10. The heated depth water flows towards the breeding trough through the outer heating basin 202, thence through the hollow blackened bottom 203 of the breeding basin, because photo-synthetis filters off only a small percentage of the incident solar radiation so that a substantial portion remains for the further heating of the depth water.

The breeding of the phyto-plankton and of marine animals in depth water heated by the waste heat of power station plant is known per se. It is also known to extract as fresh water the condensate of sea water evaporated for the purpose of heat transport. Compared with these known features, the invention consists in that energy extracted by a solar collector system floating on the surface of the sea is directly utilised in situ for breeding phyto-plankton and marine animals and the condensate so accruing is, if appropriate, used to provide fresh water.

Figure 11:
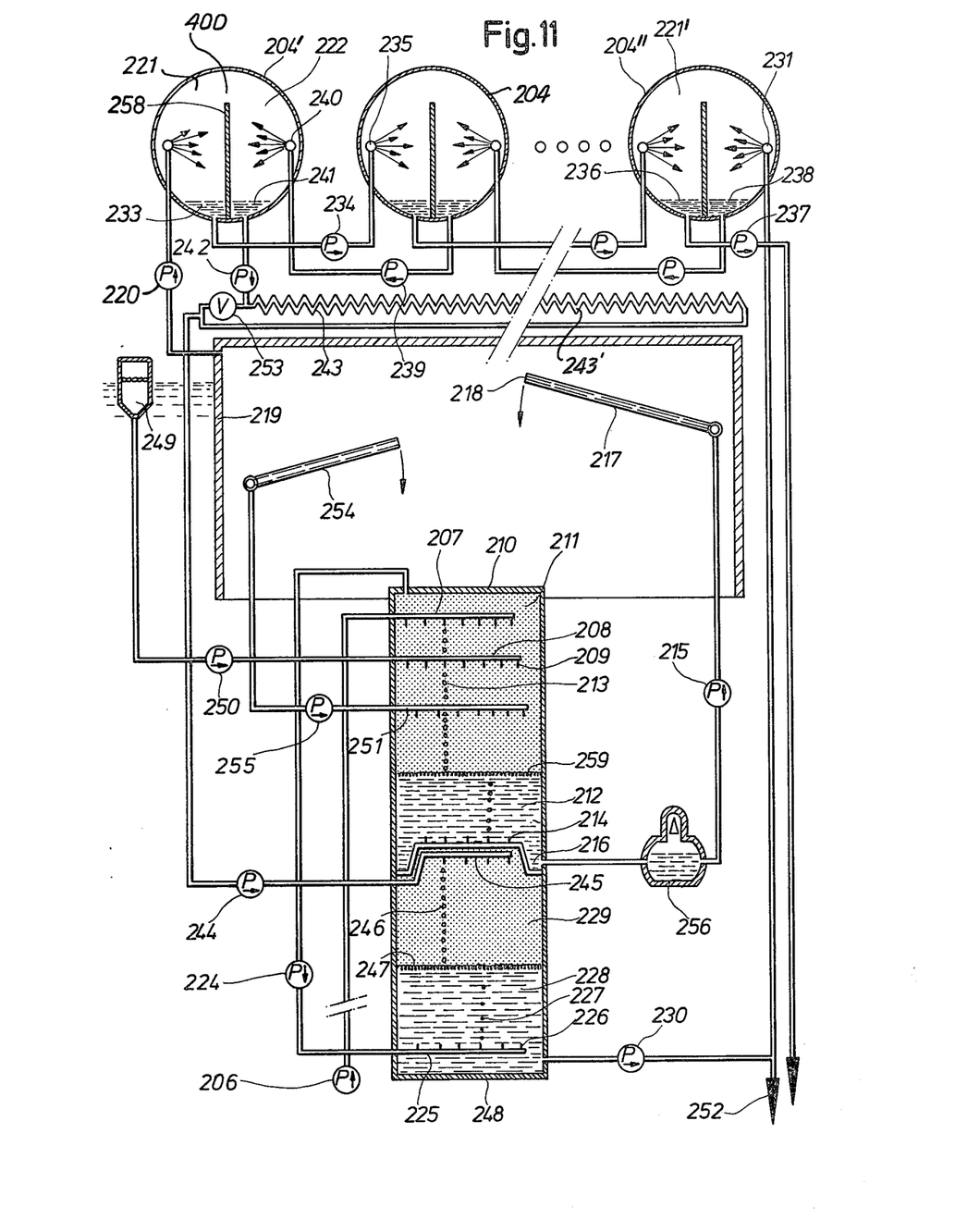
FIG. 11 shows the diagrammatic view of a distillation plant according to the invention.

Whilst the arrangement shown in FIG. 8 generates electric power, animal protein and fresh water, there is frequently a demand for fresh water alone. FIG. 11 shows a distillation plant for generating fresh water. The plant consists of the flexible solar collector 243, a storage accumulator 219, a heat exchanger 210, distillation apparatus 204, 204' and 204" and the pumps 206 and 244. The pump 206 transports cool sea water through the spray rack 207 which is immersed in the oil 211 within the top of the cylindrical heat transfer casing 210. Thereupon, the water proceeds through the separating plane 259 between the oil 211 and the water into the sea water space 212. Thus, an oil layer 211 is present in the upper region of the heat transfer casing 210. Sea water 212 is situated in the same space underneath this layer. This sea water had previously penetrated the oil in the form of droplets 213. This oil 211 had previously, after being ejected in a highly heated state, from the nozzle 214, penetrated the sea water space 212. The heated sea water is drawn by the pump 215 from the deepest layer 216 of the sea water region 212 and is conveyed to the storage accumulator 219 through a tube 217 equipped with a discharge aperture 218, adjustable in height. In this process, the heated sea water flows through a de-aerator 256, whence the dissolved gas can be removed by suction.

This heated sea water is continuously withdrawn from the storage accumulator 219 by the pump 220 and is atomised in the distillation casing 204', the first stage of the distillation cascade. In this process, a portion of the hot sea water evaporates, accompanied by simultaneous cooling down, and reaches the condensation side 222 through the space 400 between the wall of the distillation casing 240' and intermediate wall means 258 which divides the interior of the casing into saline and fresh water regions.

The oil 229 in the lower portion of the heat exchanger casing 210 emerges through the nozzle 214 and is engaged in a counter-flow heat exchange with the sea water 212, 213. The oil is extracted at the highest point of the heat transfer casing and is coveyed by the pump 224 to a spray rack 225 with nozzles 226 situated at the lowest level. The oil droplets 227, shown in black, traverse the lower fresh water space filled with fresh water 228 and form the oil layer 229.

The fresh water, cooled by the oil circulation, is conveyed by the pump 230 to the spray nozzle 231 and is sprayed into the distillation casing 204". The sea water 233 in the distillation casing 204', cooled down by a few degrees, is conveyed by the pump 234 to the spray nozzle 235. The sea water, once again slightly cooled down additionally there, is conveyed to the next distillation casing 204 and, finally, to the distillation casing 204". In this process, the sea water cools down almost to the temperature at the surface of the sea and its salt content is correspondingly increased. Each of the pumps 234 and 237 along with their connections comprise a saline water removal means for removing cool saline concentrate from a distillation casing.

The pump 237 pumps the water 236, cooled down and enriched with salt, back into the sea. The steam 221" generated in the distillation casing 204" comes into contact with the cold fresh water stream atomised by the nozzle 231 and is condensed by this spray. The fresh water 238 is thus subjected to heating up, increasing from stage to stage, and, after traversing all the stages, it reaches, conveyed by the pump 239 and sprayed by the nozzle 240, its maximum temperature. Simultaneously, the mass flow is increased by the fresh water portion condensed in the several stages. So long as the incident radiation is large enough, this hot fresh water 241 is conveyed by the pump 242 into the solar collector 243 for channels 243' extending therein. The fresh water flow, additionally heated there, is conveyed by the pump 244 to the spray rack 245. The hot water droplets 246 traverse the oil layer 229 and finally form the fresh water layer 228 underneath the separating plane 247 between the oil and the water. By the time fresh water reaches the bottom 248, of the heat transfer casing, it has transferred its entire heat to the oil flow so that hot oil droplets enter the sea water region 212 through the nozzles 214. Each of the pumps 239 and 242 along with their connections comprise a fresh water removal means for removing heated fresh water from a distillation casing. A float 249 withdraws surface water which is pumped by the pump 250 and enters, through the spray rack 208, into the circulation. The condensed portion of the cooled down fresh water is bled off by conduit 403 arrow 252 and fed into the water consumption network. During the night, the valve 253 is opened so that no further fresh water flows through the solar collector 243. The fresh water flow, conveyed by the pumps 242 and 244, has a correspondingly lower temperature at night so that the sea water portion, conveyed by the pumps 206 and 250, is also subject to less heating up. For this reason, the aperture 218 of the tube 217 is swivelled into a less hot water layer which is situated lower down. In this cooler layer, the sea water, heated by the heat of condensation in the distillation casing, is stored temporarily until solar energy is made available once again. The withdrawal of this hot water proceeds through the tube 254, also adjustable in height, and the pump 255. This temporarily stored water is mixed into the sea water flow emerging through the spray racks 207 and 208, whereby the heat of condensation temporarily stored during the preceding night is returned back into circulation.

Gas separators such as the de-aerator 256 are connected to each of the highest points of the heat transfer casing and of the storage accumulator.

Figure 12:
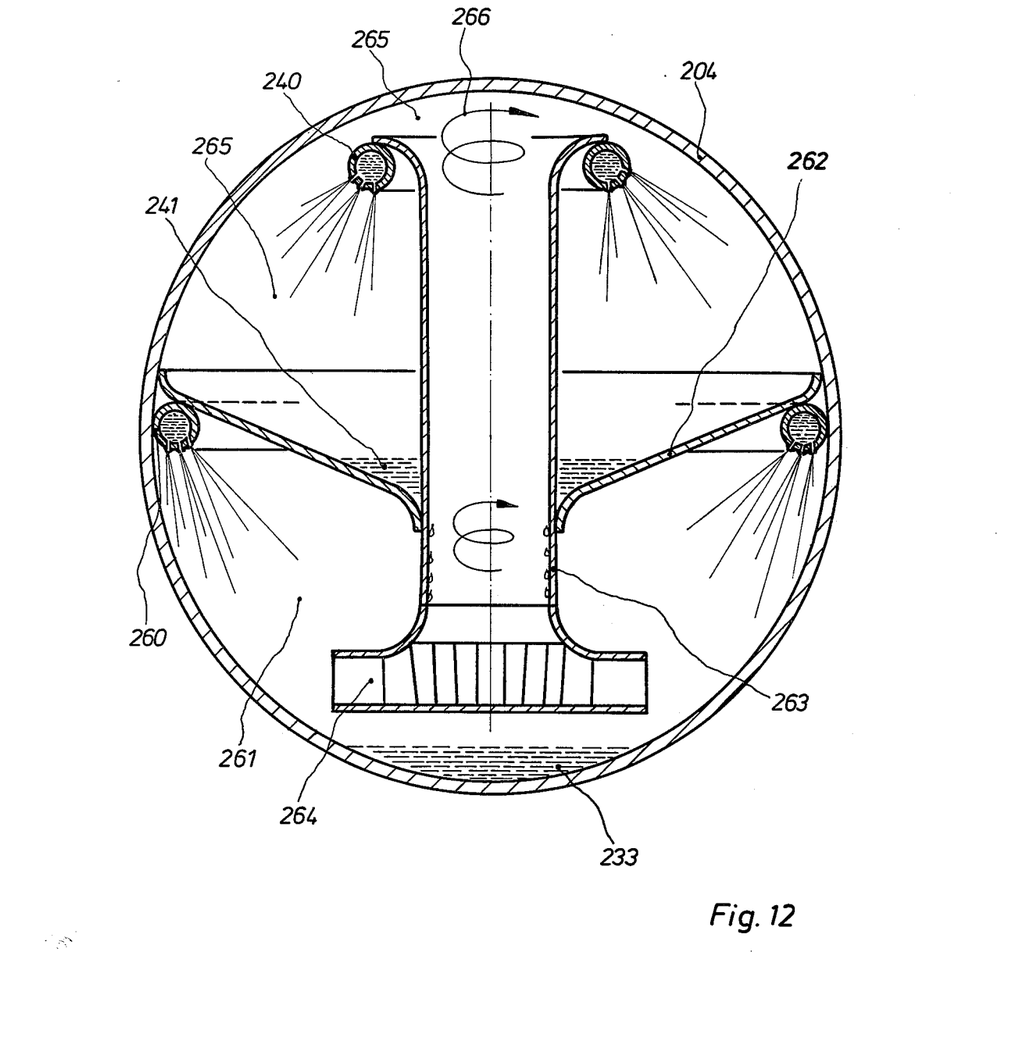
FIG. 12 shows, in a diagrammatic view, a modified form of a distillation casing for a distillation plant according to the invention.

FIG. 12 shows diagrammatically a distillation casing 401. The sea water is fed through the annular tube 260 and atomised in the space 261 underneath the conical separating wall 262. The steam so generated, to which an angular momentum has been imparted by the blade system 264, reaches the upper space 265, via another central tube 263. The rotational motion throws sea water droplets, entrained with the steam, against the wall of the tube 263, whereupon they drain into the sea water sump 233. The fresh water sump 241 is formed between the tube 263 and the conical wall 262 where the wall 262 acts as an intermediate wall means dividing the interior of the casing into saline and fresh water regions. The fresh water enters the space 265 in an atomised state through the nozzles in the annular tube 240 and takes over the condensation of the steam flow 266. A gas separator is associated with each distillation casing 204, 204', etc.

Figure 13:
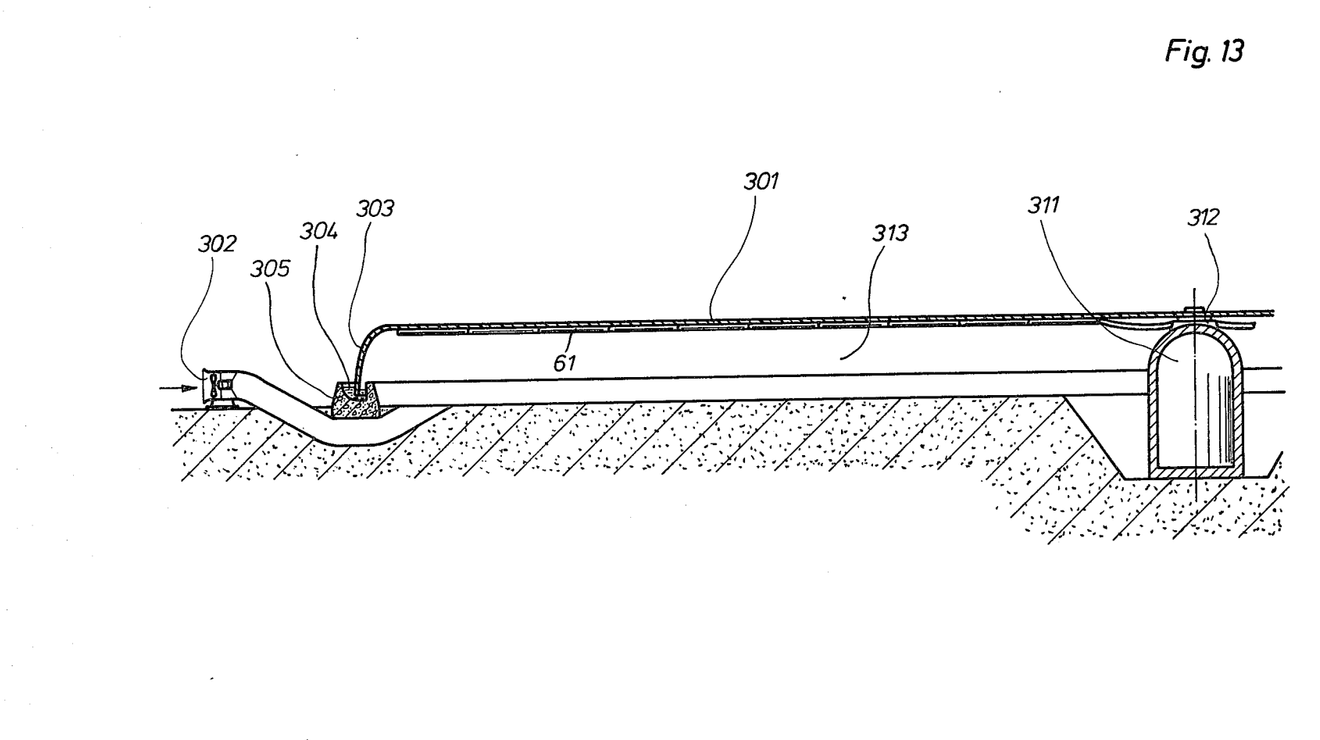
FIG. 13 shows, in a diagrammatic cross-section, a platform according to the invention with solar collector elements floating on an air cushion which can also be installed on dry land.

FIG. 13 shows a flexible platform 301 carried by an air cushion. The air cushion is held at a small excess pressure by means of a blower 302 sucking air from outside. The periphery of the flexible platform is formed by a skirt 303, the lower edge of which is immersed below a water level 304. If the plant is to be operated on dry land, a trough or ditch 305 is arranged underneath the skirt 303 and is filled with water to the level 304. The skirt 303, due to its internal excess pressure, is subject to radial loading directed outwards which holds the flexible platform 301 in a horizontal position.

We claim:

1. A solar collector comprising fresh water channels containing fresh water adapted to be heated by solar energy, a heat exchanger connected to said fresh water channels and to a source of saline water and having therein fresh water and saline water spaces and where heat is transferred from heated fresh water to saline water, at least one distillation casing having an intermediate wall means therein dividing the interior of the casing into a fresh water region and a saline water region with the saline water region being connected to the saline water space and the fresh water region being connected to the fresh water space, said heat exchanger being positioned between said fresh water channels and said distillation casing with respect to the flow of fresh water through said solar collector and such that said heat exchanger is directly upstream of said distillation casing and directly downstream of said fresh water channels, means for spraying heated saline water from said saline water space into the saline water region where it is cooled to form a vapor and a saline water concentrate, means for spraying fresh water from said fresh water space into the fresh water region to condense said vapor to form additional fresh water and wherein said saline water transfers heat to said fresh water, saline water removal means for removing cooled saline water concentrate from said saline water region and fresh water removal means for removing heated fresh water from said fresh water region.

2. A solar collector according to claim 1 having a plurality of distillation casings connected in stages and wherein the cooled saline water concentrate removed from a first casing by the saline water removal means is sprayed into a second casing and wherein the heated fresh water removed from the second casing by the fresh water removal means is sprayed into the first casing where it is further heated by heat transferred from the saline water sprayed therein.

3. A solar collector according to claim 2 wherein the fresh water removal means for removing heated fresh water from said first distillation casing is connected to said fresh water channels whereby the heated fresh water removed from the first distillation casing is further heated by solar energy.

4. A solar collector according to claim 1 including in addition bleed means by which fresh water from said fresh water region may be bled off to a water consumption network.

5. A solar collector according to claim 1 including in addition a heat storage accumulator connected to the saline water region of the heat exchanger whereby heat energy accumulated in said accumulator may be continually imparted to said saline water region.

6. A solar collector according to claim 1 wherein said intermediate wall means has a tube extending therethrough through which vapor may pass from said saline water region to said fresh water region and wherein said tube has means for imparting rotation to the vapor passing therethrough.

* * * * *